(12) United States Patent
Yoshida (10) Patent No.: US 8,199,112 B2
(45) Date of Patent: Jun. 12, 2012

(54) CHARACTER INPUT DEVICE

(75) Inventor: Kohei Yoshida, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1219 days.

(21) Appl. No.: 12/001,017

(22) Filed: Dec. 7, 2007

(65) Prior Publication Data

US 2008/0158201 A1 Jul. 3, 2008

(30) Foreign Application Priority Data

Dec. 27, 2006 (JP) .................. 2006-353423

(51) Int. Cl.
G09G 5/00 (2006.01)
(52) U.S. Cl. ...................... 345/171; 345/173
(58) Field of Classification Search ............ 345/168, 345/179, 171, 173; 341/28; 704/231, 260
See application file for complete search history.

(56) References Cited

U.S. PATENT DOCUMENTS

| | | | | |
|---|---|---|---|---|
| 5,164,900 | A * | 11/1992 | Bernath | 715/264 |
| 5,295,070 | A * | 3/1994 | Justice | 704/2 |
| 5,835,924 | A | 11/1998 | Maruyama et al. | |
| 7,884,804 | B2 * | 2/2011 | Kong | 345/173 |
| 2002/0158779 | A1 * | 10/2002 | Ouyang | 341/28 |
| 2003/0006967 | A1 * | 1/2003 | Pihlaja | 345/168 |
| 2004/0239645 | A1 | 12/2004 | Numano | |
| 2004/0252035 | A1 * | 12/2004 | Chang | 341/28 |
| 2005/0114138 | A1 * | 5/2005 | Tomishige et al. | 704/260 |

FOREIGN PATENT DOCUMENTS

| | | |
|---|---|---|
| CN | 1135060 A | 11/1996 |
| CN | 1318786 A | 10/2001 |
| CN | 1527190 A | 9/2004 |
| CN | 1848047 A | 10/2006 |
| JP | 5-265628 A | 10/1993 |
| JP | 08-272780 A | 10/1996 |
| JP | 09-128376 A | 5/1997 |
| JP | 2004-234212 A | 8/2004 |
| JP | 2005-157751 A | 6/2005 |
| JP | 2005-165533 A | 6/2005 |
| JP | 2006-262389 A | 9/2006 |

(Continued)

OTHER PUBLICATIONS

Korean Office Action dated Jun. 30, 2009 (3 pages), and English translation thereof (2 pages), issued in counterpart Korean Application Serial No. 10-2007-0137653.

(Continued)

*Primary Examiner* — Quan-Zhen Wang
*Assistant Examiner* — Calvin C Ma
(74) *Attorney, Agent, or Firm* — Holtz, Holtz, Goodman & Chick, PC (57) ABSTRACT

When a search character string is input via a key input section and a handwriting input section, if a spelling is input, a character is input directly by a key input operation or a recognized character is input by a handwriting input operation. If pinyin is input to input a Chinese character, not only are alphabetic characters input by a key input operation, but also the four tones area input by touching a four-tone input screen displayed on the handwriting input section. Accordingly, not only can ordinary characters be input as usual, of course, but also Chinese-specific four tones can be input easily by a touch operation at the handwriting input section even when a pinyin character is input.

8 Claims, 10 Drawing Sheets

FOREIGN PATENT DOCUMENTS

KR 2005-7859 A 1/2005

OTHER PUBLICATIONS

Chinese Office Action dated Aug. 28, 2009 and English translation thereof issued in a counterpart Chinese Application No. 2007103011597.
Chinese Office Action dated Dec. 25, 2009 and English translation thereof issued in a counterpart Chinese Application No. 2007103011597.
Chinese Office Action dated Mar. 13, 2009 (6 pages), and English translation thereof (9 pages), issued in counterpart Chinese Application Serial No. 2007103011597.
Japanese Office Action (and English translation thereof) dated Oct. 28, 2008, issued in a counterpart Japanese Application.
Japanese Office Action dated May 24, 2011 (and English translation thereof) in counterpart Japanese Application No. 2008-328922.

* cited by examiner

CHARACTER INPUT DEVICE

CROSS-REFERENCE TO RELATED APPLICATIONS

This application is based upon and claims the benefit of priority from prior Japanese Patent Application No. 2006-353423, filed Dec. 27, 2006, the entire contents of which are incorporated herein by reference.

BACKGROUND OF THE INVENTION

1. Field of the Invention

This invention relates to a character input device which includes a key input section and a handwriting input section and is for inputting characters.

2. Description of the Related Art

A handwritten character input device has been put to practical use. The handwritten character input device includes a character input unit to which the user inputs the desired characters by directly operating the character input keys as in the word processor, and a touch panel handwriting input unit. The handwritten character input via the handwriting input unit is character-recognized and the recognized character is input to the handwritten character input device.

Moreover, an electronic dictionary device capable of using a key input character string as a keyword (search character string) to search a dictionary for its semantic content and displaying the retrieved data has been put to practical use.

Furthermore, Jpn. Pat. Appln. KOKAI Publication No. 2005-165533 has disclosed an electronic dictionary device with a handwriting input function which includes not only a key input unit (keyboard) for inputting a keyword (search character string) for searching the dictionary but also a handwriting input unit and which enables the user to handwrite kanji characters or the like the user cannot read on the handwriting input unit, recognizes the characters, inputs the characters as the keyword (search character string), and displays the dictionary search.

In recent years, electronic dictionary devices have included dictionaries which deal with various languages. There are words, such as Chinese words or Spanish words, which are expressed by unique pronunciations and symbols difficult to input from the character keys and alphabetic keys on an ordinary keyboard. To input such a unique pronunciation and a symbol, it is common practice to input, for example, a special symbol printed on the outside of the top of a key by operating not only the key but also the shift key.

An electronic dictionary device to which the user inputs pinyin, a Chinese pronunciation, in searching a Chinese dictionary for a word corresponding to the pinyin has been considered as disclosed in, for example, Jpn. Pat. Appln. KOKAI Publication No. 2005-157751.

Compact, large-screen electronic dictionary devices have recently become mainstream. Since the size of the device body, or the keyboard space, is limited and the number of keys is also restricted, it is an important matter how to input language-specific characters or symbols easily and efficiently.

It is, accordingly, an object of the invention to provide a character input device capable of inputting language-specific characters easily and efficiently without changing the configuration of the keyboard.

BRIEF SUMMARY OF THE INVENTION

According to an aspect of the invention, there is provided a character input device comprising: a display section; a key input section; a handwriting input section in which a touch position sensing unit and a display unit are integrated with each other; handwriting section display control means for causing the handwriting input section to give a representation for inputting a character absent in the key input section by sensing the position of a touch on the handwriting input section; and display section display control means for displaying on the display section a character input via the key input section and a character input via the handwriting section display-controlled by the handwriting section display control means.

In the character input device of the invention, when pinyin is input to display it on the display section, the handwriting section display control means causes the handwriting input section to give a representation for inputting a character corresponding to the four tones produced by the pinyin input.

Moreover, in the character input device of the invention, when a dictionary search character string is input to display it on the display section, the handwriting section display control means causes the handwriting input section to give a representation for inputting a wild-card character corresponding to an unknown character in the search character string.

Furthermore, in the character input device of the invention, when a Spanish word is input to display it on the display section, the handwriting section display control means causes the handwriting input section to give a representation for inputting a character corresponding to the n tilde of the Spanish word.

According to the invention, it is possible to provide a character input device capable of inputting language-specific characters easily and efficiently without changing the configuration of the keyboard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
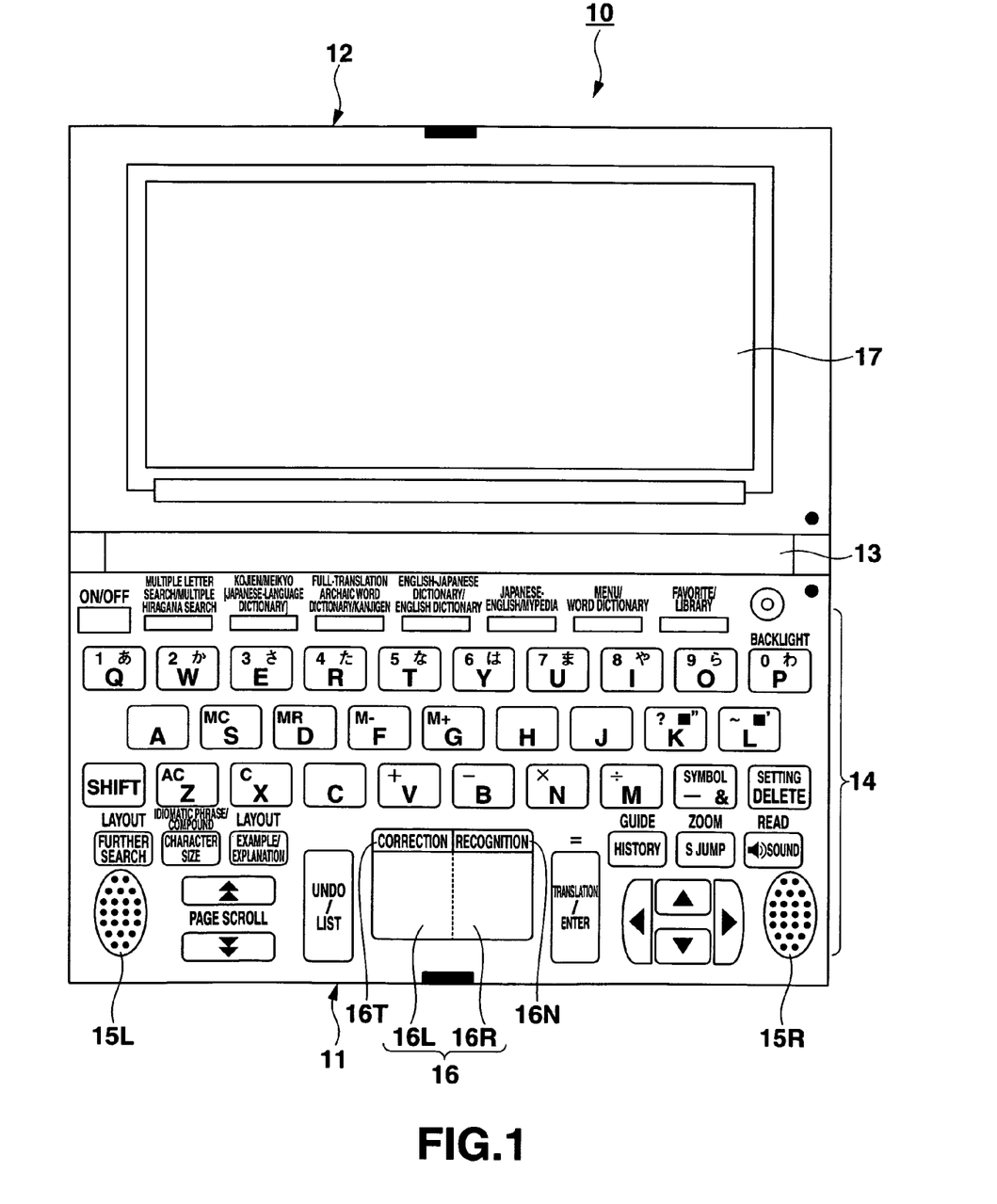
FIG. 1 is a front view showing an outward configuration of an electronic dictionary device 10 with a handwriting input function according to an embodiment of a character input device of the invention.

FIG. 1 is a front view showing an outward configuration of an electronic dictionary device 10 with a handwriting input function according to an embodiment of a character input device of the invention.

The electronic dictionary device 10 is so configured that a body case 11 and a cover case 12 are coupled with each other via a hinge section 13, thereby forming an openable and closable folding case. On the front face of the body case 11, there are provided a key input section 14 which includes a power key, various character and symbol keys, a dictionary specification key, a translate/decide key, a delete key, cursor keys, and others, speakers 15L, 15R, and a handwriting input section 16.

The handwriting input section 16 has a structure where a touch position sensing unit for sensing the position at which the user has touched with a pen, his or her finger, or the like is integral with a display unit. For example, the handwriting input section 16 is so configured that a transparent tablet is laid on a 128×64 dot liquid-crystal display screen on the center front side of the key input section 14.

The input area of the handwriting input section 16 has writing areas 16L, 16R for two characters. At the upper hem of the input area of the handwriting input section 16, the characters "Recognize" and "Correct" are printed on the tablet surface. The individual printed parts function as "Recognize" button 16N for the user to specify character recognition and as "Correct" button 16T for the user to correct or delete the recognized characters.

The handwritten strokes on the writing areas 16L, 16R of the handwriting input section 16 are echoed back onto the liquid-crystal screen, which displays the strokes.

On almost all the front face of the cover case 12, there is provided a display section (for example, a 480×320 dot liquid-crystal display screen) 17 with a backlight.

Figure 2:
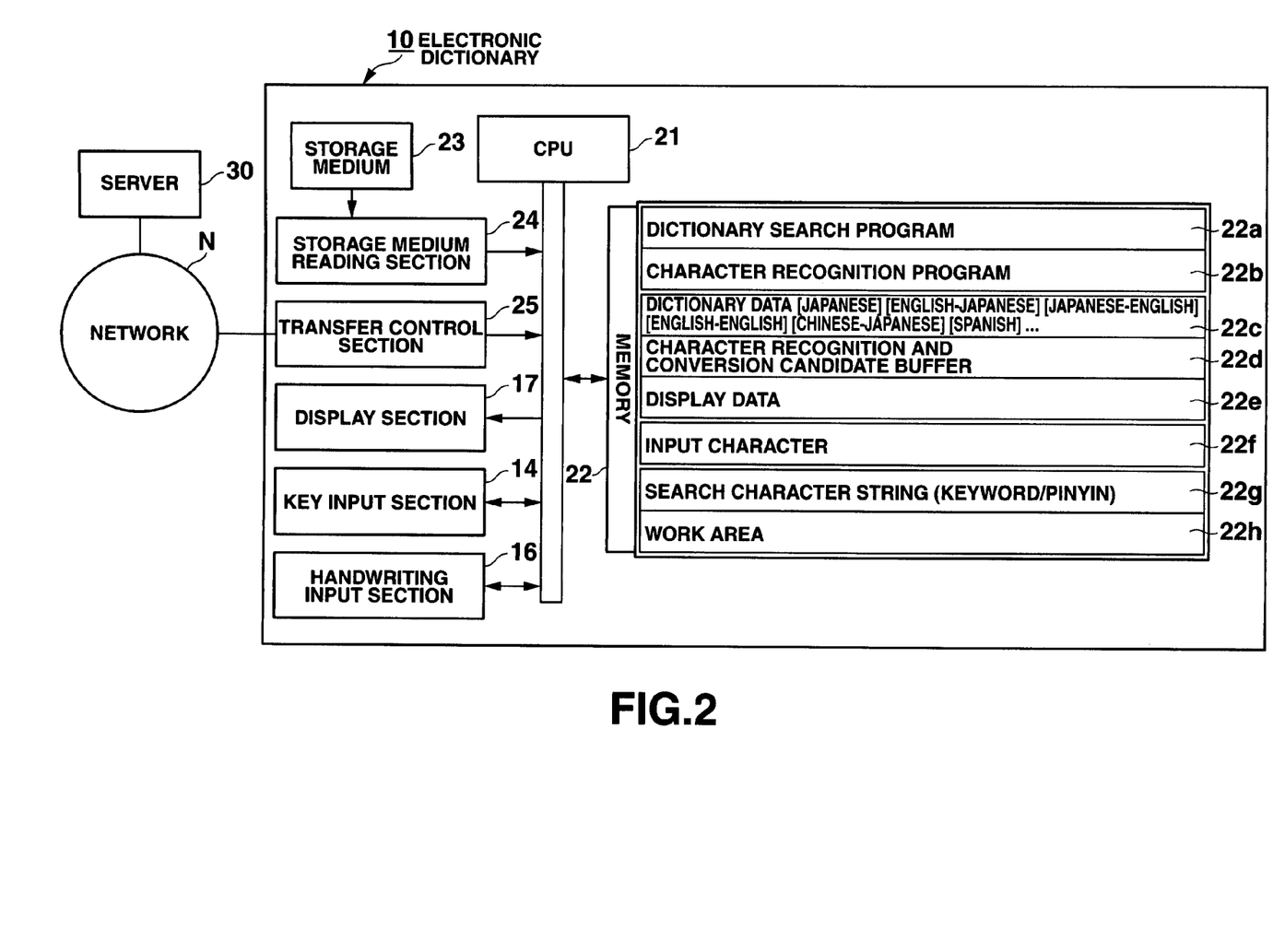
FIG. 2 is a block diagram showing the configuration of the electronic circuit of the electronic dictionary device 10.

FIG. 2 is a block diagram showing the configuration of the electronic circuit of the electronic dictionary device 10 with a handwriting input function.

The electronic dictionary device 10 is composed of a computer controlled by a program. The electronic circuit of the electronic dictionary device 10 includes a central processing unit (CPU) 21.

Connected to the CPU 21 are not only a memory 22, a storage medium reading section 24, a transfer control section 25, the key input section 14, and the handwriting input section 16 but also the display section 17, and others.

The memory 22 stores not only a system program which supervises the overall operation of the electronic dictionary device 10 and a communication program for data communication with each Web server 30 and a user personal computer (PC) (not shown) on the Internet N via the transfer control section 25 but also a dictionary searching program 22a for controlling the overall searching process on the basis of dictionary data (22c), including the entry word searching process according to the input of a search character string (keyword/pinyin) on the basis of the dictionary data (22c) and the process of reading and displaying various pieces of explanatory information, such as the translated word, semantic content, and example sentence (example) corresponding to a specified entry word, and a character recognition program 22b for recognizing handwritten characters displayed on the handwriting input section 16.

These programs may be stored in the memory 22 in advance or be read into the memory 22 from an external storage medium 23, such as a ROM card, via the storage medium reading section 24. Alternatively, these programs may be read into the memory 22 from a Web server (in this case, a program server) 30 on the Internet N via the transfer control section (communication section) 25.

Moreover, in the memory 22, there are provided a dictionary data memory 22c, a character recognition and conversion candidate buffer 22d, a display data memory 22e, an input character memory 22f, a search character string (keyword/pinyin) memory 22g, a work area 22h, and others.

Different types of dictionary data, including a Japanese dictionary, an English-Japanese dictionary, a Japanese-English dictionary, an English dictionary, a Chinese-Japanese (Chinese) dictionary, and a Spanish-Japanese (Spanish) dictionary, are stored in advance or downloaded into the dictionary data memory 22c.

When the handwritten characters input via the handwriting input section 16 are subjected to a character recognition process according to the character recognition program 22b, for example, a first to a tenth one of the recognized and converted candidate characters are stored in the character recognition and conversion candidate buffer 22d.

The display data memory 22e has a storage area for display data corresponding to the display screen of the display section 17 and a storage area for display data corresponding to the display screen of the handwriting input section 16. The data to be displayed on each of the display screens is expanded and stored in the display data memory 22e in the form of bitmap pattern data.

The input character memory 22f stores input data, including numbers, characters, and symbols input by the user at the key input section 14 or handwriting input section 16, according to the dictionary searching program 22a.

The search character string (keyword/pinyin) memory 22g stores not only a character or a character string input or specified as the object of a dictionary searching process but also a pinyin character or character string in the pinyin mode in which the Chinese dictionary is searched on the basis of its pronunciation.

The work area 22h stores various items of data input to and output from the CPU 21 according to various device control programs, including the dictionary searching program 22a and character recognition program 22b, as needed.

Next, the operation of the electronic dictionary device 10 as configured as described above will be explained.

First, explanation will be given using a case where the user inputs Chinese characters using the handwriting input section 16 or pinyin using the keyboard 14, thereby searching the Chinese-Japanese dictionary.

Figure 3:
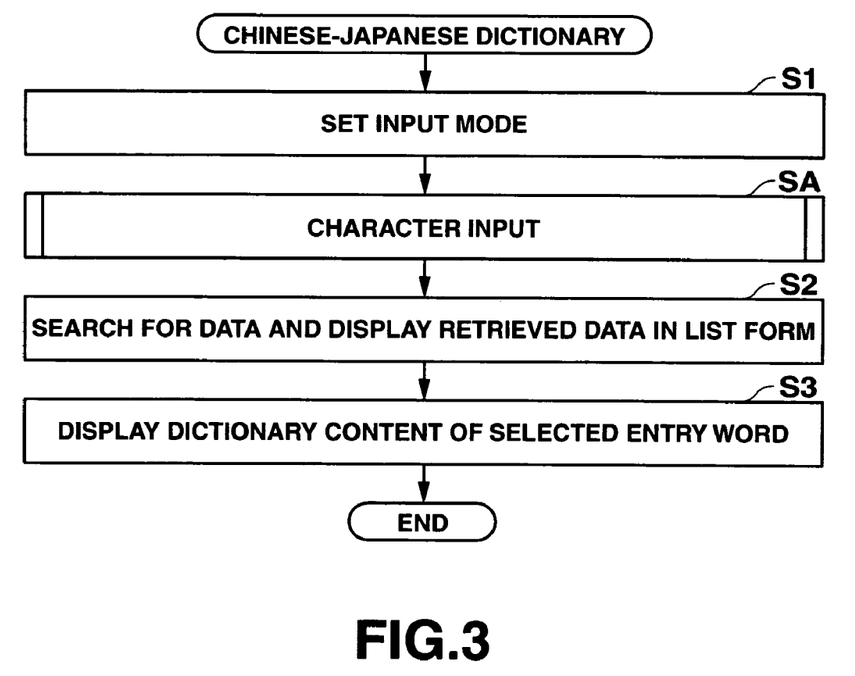
FIG. 3 is a flowchart to help explain the dictionary searching process of the electronic dictionary device 10.

FIG. 3 is a flowchart to help explain the Chinese-Japanese dictionary searching process of the electronic dictionary device 10 with a handwriting input function.

Figure 4:
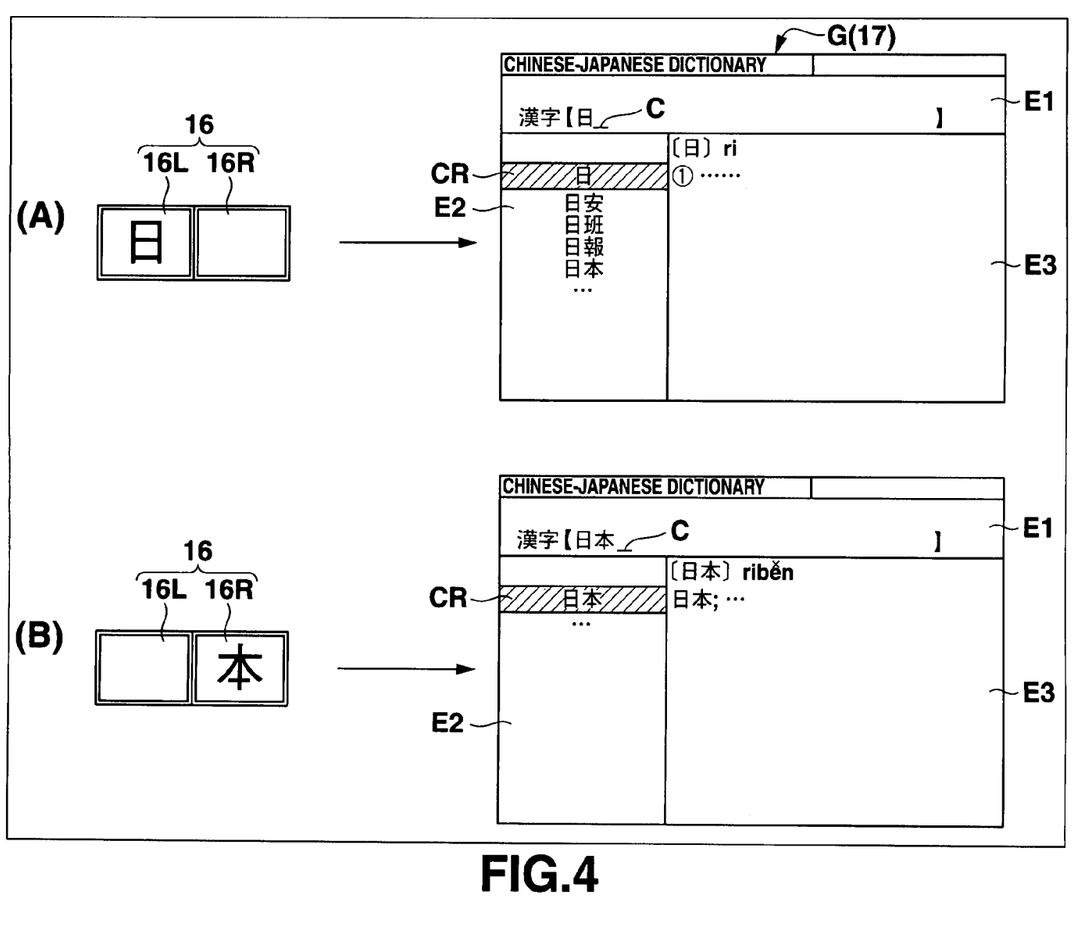
FIG. 4 is a diagram to help explain the dictionary search and display operation involved in the Chinese-Japanese dictionary searching process in the handwriting input mode of the electronic dictionary device 10.

FIG. 4 is a diagram to help explain the dictionary search and display operation involved in the Chinese-Japanese dictionary searching process in the handwriting input mode of the electronic dictionary device 10.

Figure 5:
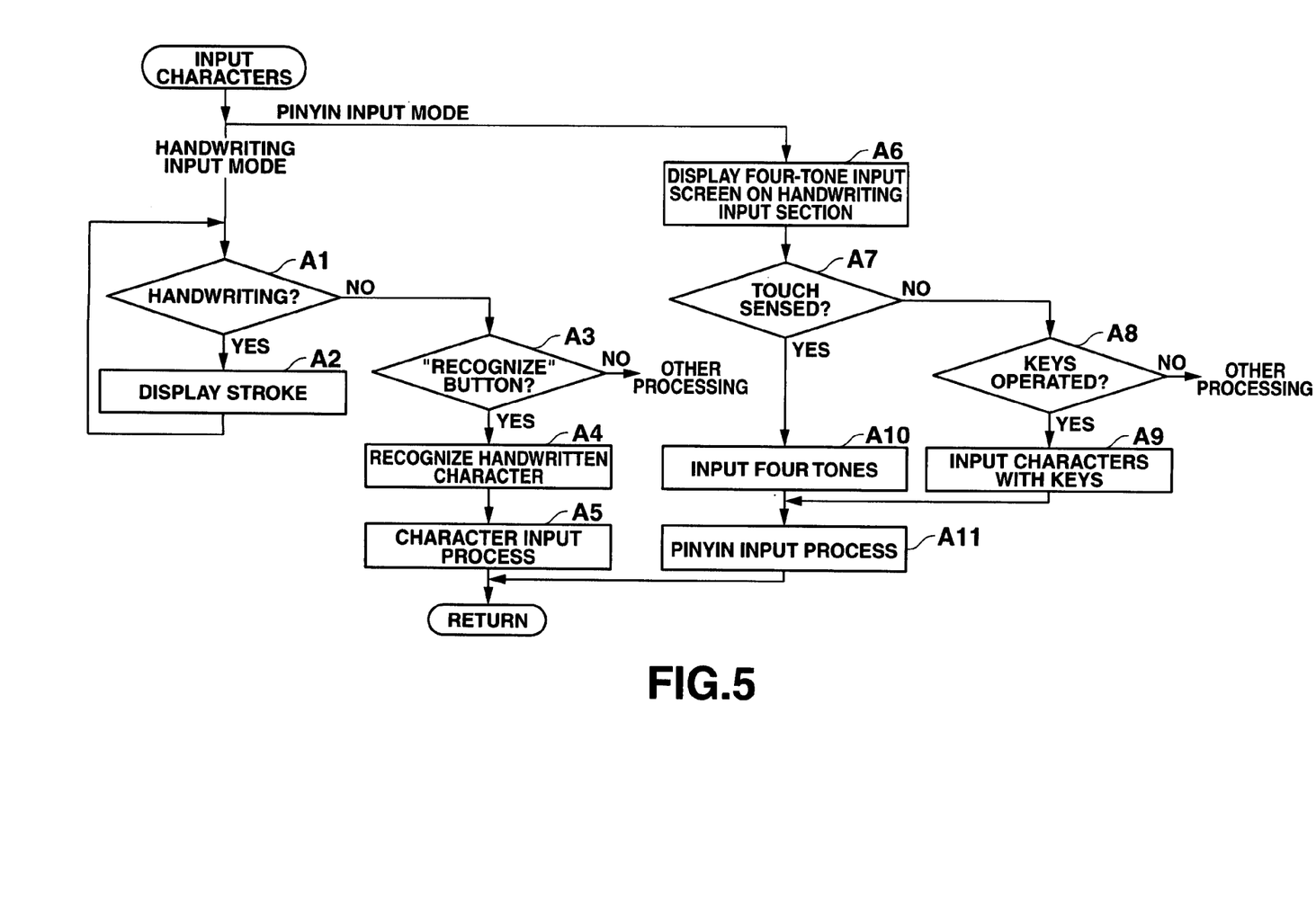
FIG. 5 is a flowchart to help explain the character input process involved in the dictionary searching process of the electronic dictionary device 10.

FIG. 5 is a flowchart to help explain the character input process involved in the dictionary search process of the electronic dictionary device 10.

Figure 6:
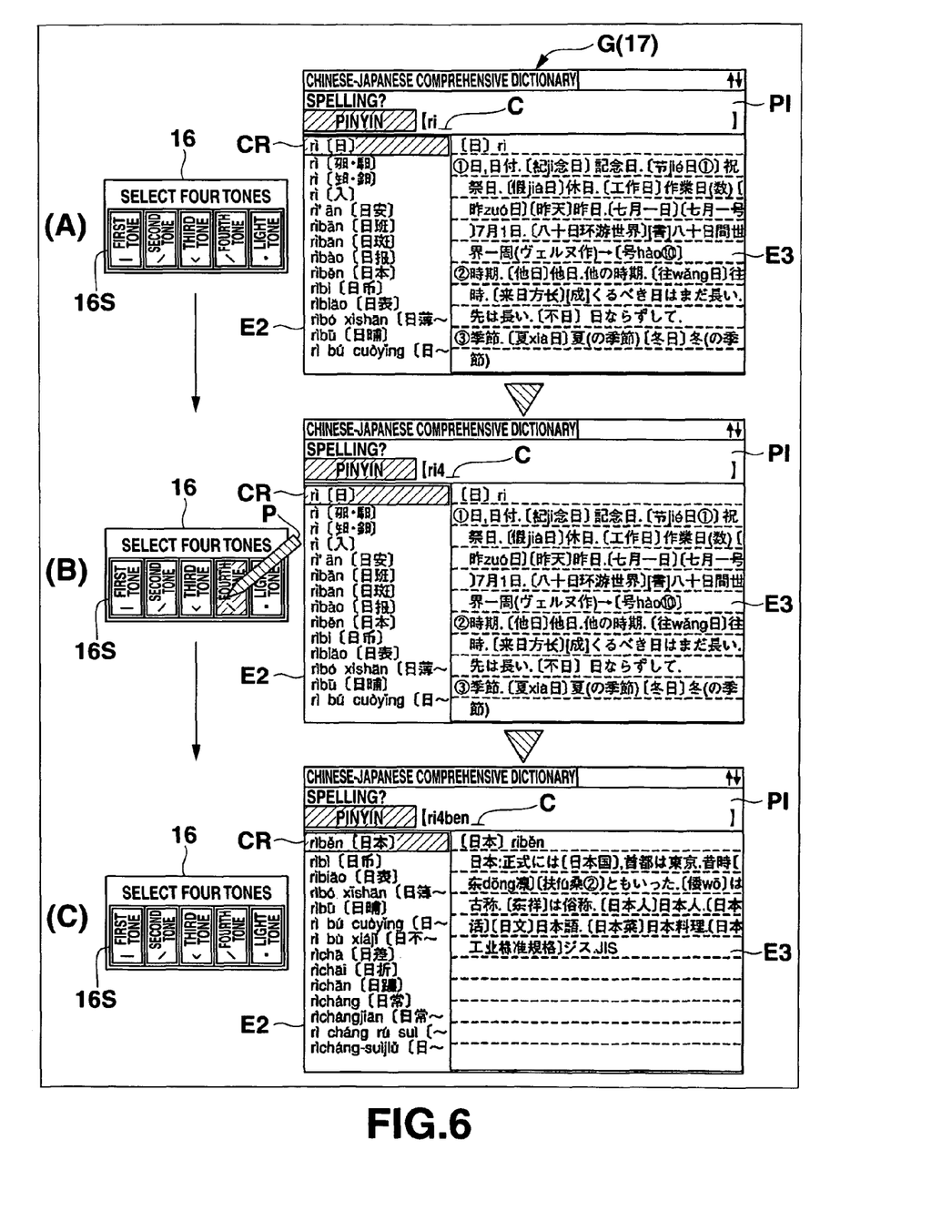
FIG. 6 is a diagram to help explain the dictionary search and display operation involved in the Chinese-Japanese dictionary searching process in the pinyin input mode of the electronic dictionary device 10.

FIG. 6 is a diagram to help explain the dictionary search and display operation involved in the Chinese-Japanese dictionary searching process in the pinyin input mode of the electronic dictionary device 10.

When the user specifies "Chinese-Japanese dictionary" as a dictionary to be used in this time's dictionary search using the dictionary specification key at the input key section 14, the process of the Chinese-Japanese dictionary in FIG. 3 is carried out. In this step, it is determined according to the operation by the user whether the input mode in searching a dictionary is set to the handwriting input mode in which a search character string of Chinese characters is input by handwritten character recognition or the pinyin input mode in which the alphabet corresponding to the pronunciation of a word is input on the keyboard (step S1).

Here, if the user has set the handwriting input mode, a dictionary searching screen G (see FIG. 4(A)) with a Chinese-character search character input area E1 is displayed on the display section 17 and then the electronic dictionary device goes into the search character string (keyword) input waiting state. Then, control is passed to the character input process (the handwriting input mode) in FIG. 5 (step SA).

In the character input process (the handwriting input mode), when a touch operation accompanying the user handwriting input has been sensed at the handwriting input section 16 (step A1) as shown in FIG. 4(A) (step A1), the stroke corresponding to the touch position sensed in the writing area 16L (or 16R) is displayed (step A1→step A2).

Then, when the touch operation of "Recognize" button 16N provided at the top right of the handwriting input section 16 has been sensed (Yes in step A3), the handwritten character drawn and displayed in the writing area 16L (or 16R) at that time is recognized according to the character recognition program 22b (step A4).

Then, the recognized character obtained in the character recognition process is displayed in the position of cursor C in the search character input area E1 and stored in the search character string (keyword) memory 22g (step A5).

As described above, when the search character string (keyword) is input to the search character input area E1 of the dictionary search screen G in such a manner that, for example, the string is character-recognized sequentially as "日"and "本"as shown in FIGS. 4(A) and 4(B), the entry word which head-coincides with a series of search character strings (keywords) at that time is searched for on the basis of the user-specified dictionary data "Chinese-Japanese dictionary" (22c) each time one character is input and is displayed in an entry word list area E2 (step S2).

Then, the dictionary content (explanatory information) corresponding to the entry word selected by an inverted cursor CR in the entry word list area E2 is read from the user-specified dictionary data "Chinese-Japanese dictionary" (22c) and is displayed in the dictionary content display area E3 (step S3).

On the other hand, in step S1, if the user has set the pinyin input mode in which the Chinese-Japanese dictionary is searched using pinyin, a Chinese pronunciation, a dictionary searching screen G (see FIG. 6(A)) with a pinyin input area PI is displayed on the display section 17 and the electronic dictionary device goes into the search character string (pinyin) input waiting state. Then, control is passed to the character input process (the pinyin input mode) in FIG. 5 (step SA).

When the character input screen (the pinyin input mode) is started, first, the writing areas 16L, 16R of the handwriting input section 16 are displayed in the form of a four-tone input screen 16S for touch-inputting the intonation of Chinese pronunciation (pinyin) (step A6).

On the four-tone input screen 16S displayed on the handwriting input section 16, "First tone" button, "Second tone" button, "Third tone" button, "Fourth tone" button, and "Light tone" button each marked with a symbol representing the rise and fall of the intonation are displayed.

In the pinyin input mode, letters of the alphabet corresponding to the pronunciation of a word to be searched for by a key operation at the key input section 14 are input (step A8→A9, A11) and the four tones are further input by touching the individual input buttons on the four-tone input screen 16S (step A7→A10, A11).

For example, as shown in FIGS. 6(A)(B), after the key input of pinyin "ri" by operating "R" and "I" at the key input section 14 (step A8→A9, A11), when "Four tones" on the four-tone input screen 16S is touched for input (step A7→A10, A11), the characters and symbols obtained by the pinyin input are displayed as pinyin "ri4" in the position of cursor C in the pinyin input area PI and are stored in the search character string (pinyin) memory 22g (step A11).

As described above, when the search character string has been input and displayed sequentially as, for example, "rl4"→"ri4ben" in the pinyin input area PI of the dictionary searching screen G as shown in FIGS. 6(A) to (C), the entry word which head-coincides with a series of search character strings at that time is searched for as "日"→"日本" on the basis of the user-specified dictionary data "Chinese-Japanese dictionary" (22c) each time one unit of pinyin is input and is displayed in an entry word list area E2 (step S2).

Then, the dictionary content (explanatory information) corresponding to the entry word "日"or "日本"selected by an inverted cursor CR in the entry word list area E2 is read from the user-specified dictionary data "Chinese-Japanese dictionary" (22c) and is displayed in the dictionary content display area E3 (step S3).

Accordingly, with the electronic dictionary device 10 with a handwriting input function configured as described above, when Chinese characters are input, if characters are handwritten, the characters are recognized by the handwriting input operation, whereas if the pinyin character input is performed, letters of the alphabet are input by the key input operation and the four tones are further input by touching the four-tone input screen 16S set and displayed on the handwriting input section 16. This makes it possible to easily input characters to be searched for and carry out the dictionary searching process efficiently.

In the embodiment, the means for inputting language-specific symbols and characters has been such that, for example, when pinyin is input, the four-tone input screen 16S set and displayed on the handwriting input section 16 is touched to input he pinyin. However, the invention is not limited to this. For instance, as shown in FIGS. 7 and 8, when the English dictionary is searched, the user may touch wild card input screens 16W, 16B set and displayed on the handwriting input section 16 to input and display a wild card symbol "?" in place of a spelling the user does not know, or to input and display a blank word symbol "~" in place of a series of spellings the user does not know.

Figure 9:
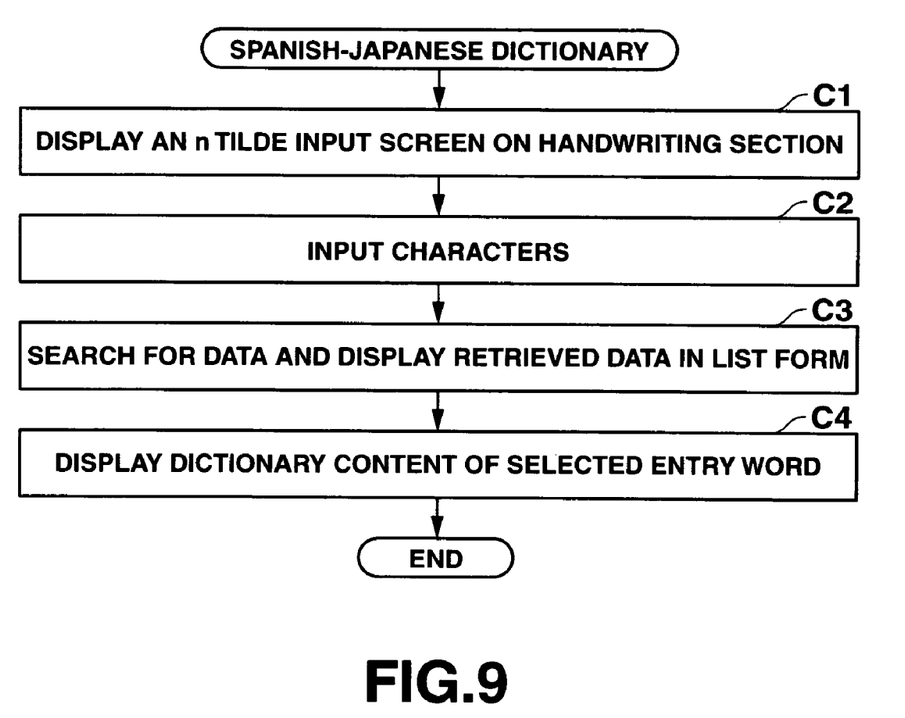
FIG. 9 is a flowchart to help explain the Spanish-Japanese dictionary searching of the electronic dictionary device 10.
Figure 10:
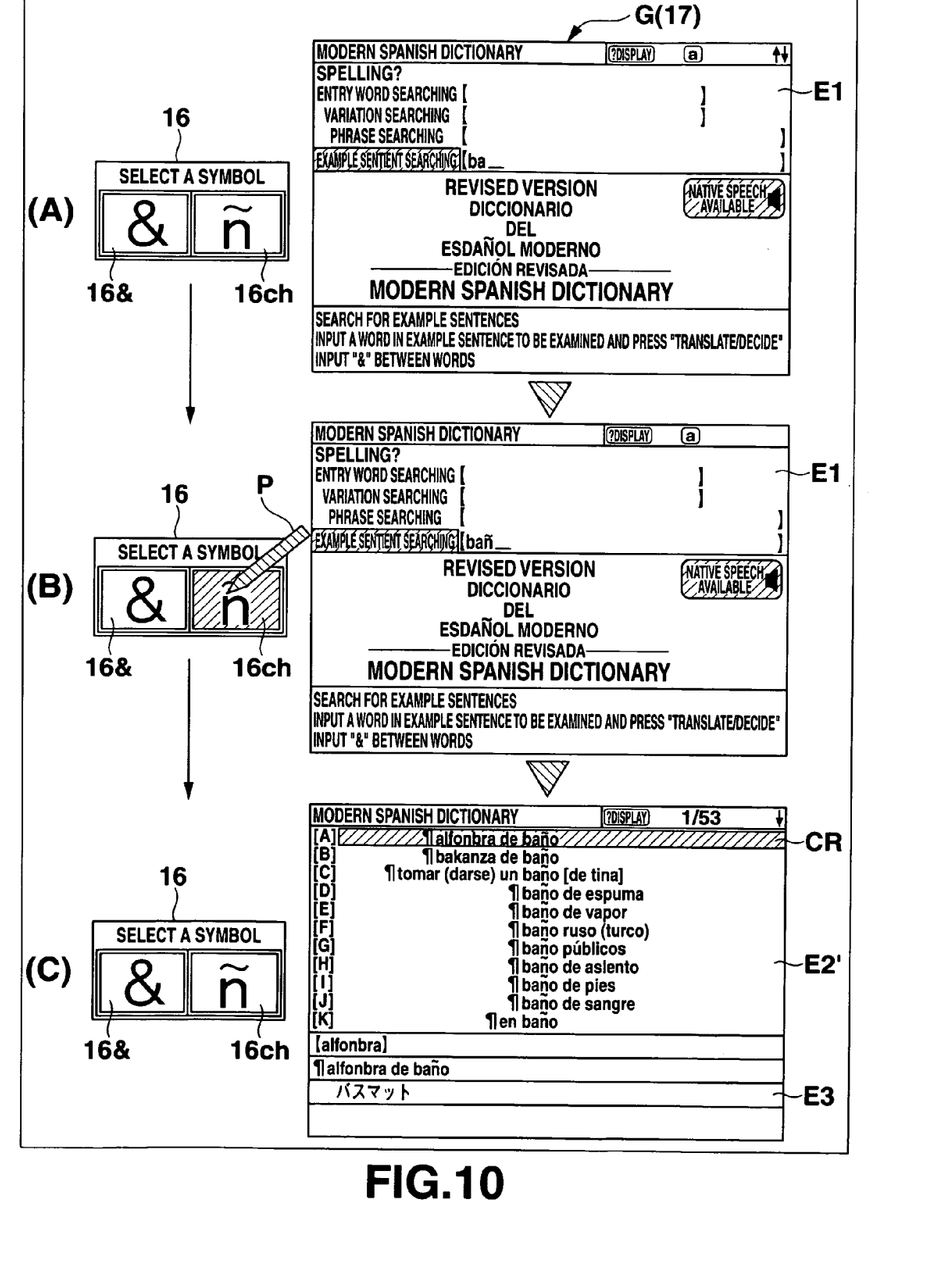
FIG. 10 is a diagram to help explain the example sentence search and display operation involved in the Spanish-Japanese dictionary searching process of the electronic dictionary device 10.

Furthermore, as shown in FIGS. 9 and 10, when the Spanish dictionary is searched, the user may touch n tilde input screens 16&, 16ch set and displayed on the handwriting input section 16 to input and display a Spanish special character, such as, n tilde "n".

Figure 7:
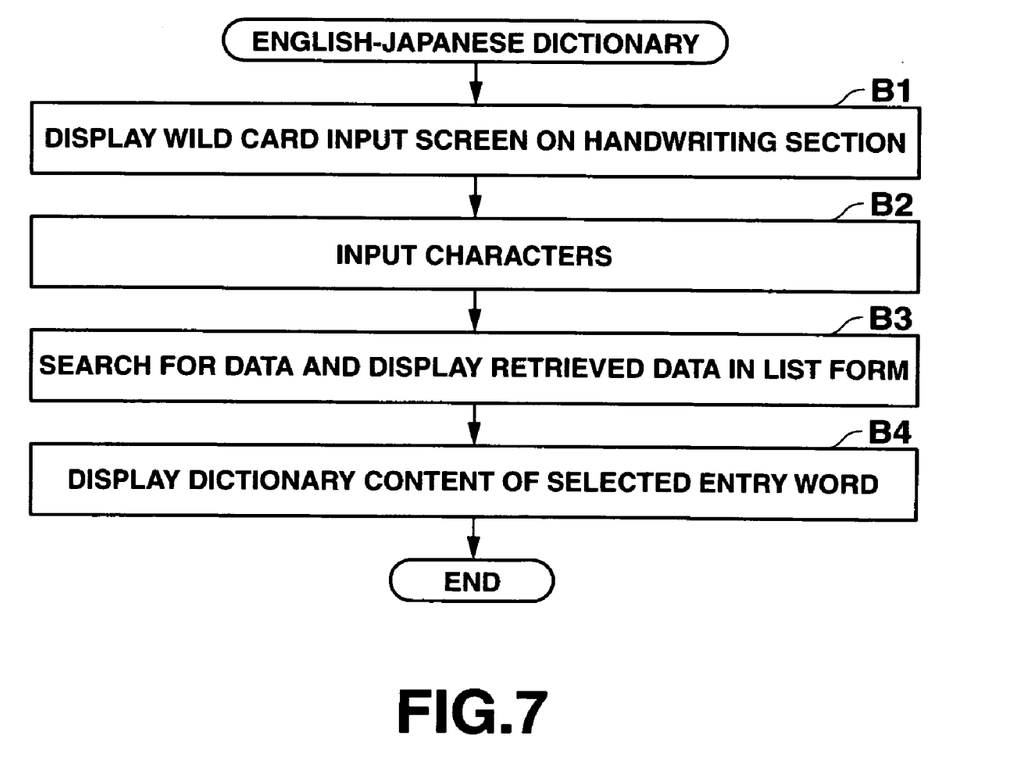
FIG. 7 is a flowchart to help explain the English-Japanese dictionary searching of the electronic dictionary device 10.

FIG. 7 is a flowchart to help explain the English-Japanese dictionary searching process of the electronic dictionary device 10 with a handwriting input function.

Figure 8:
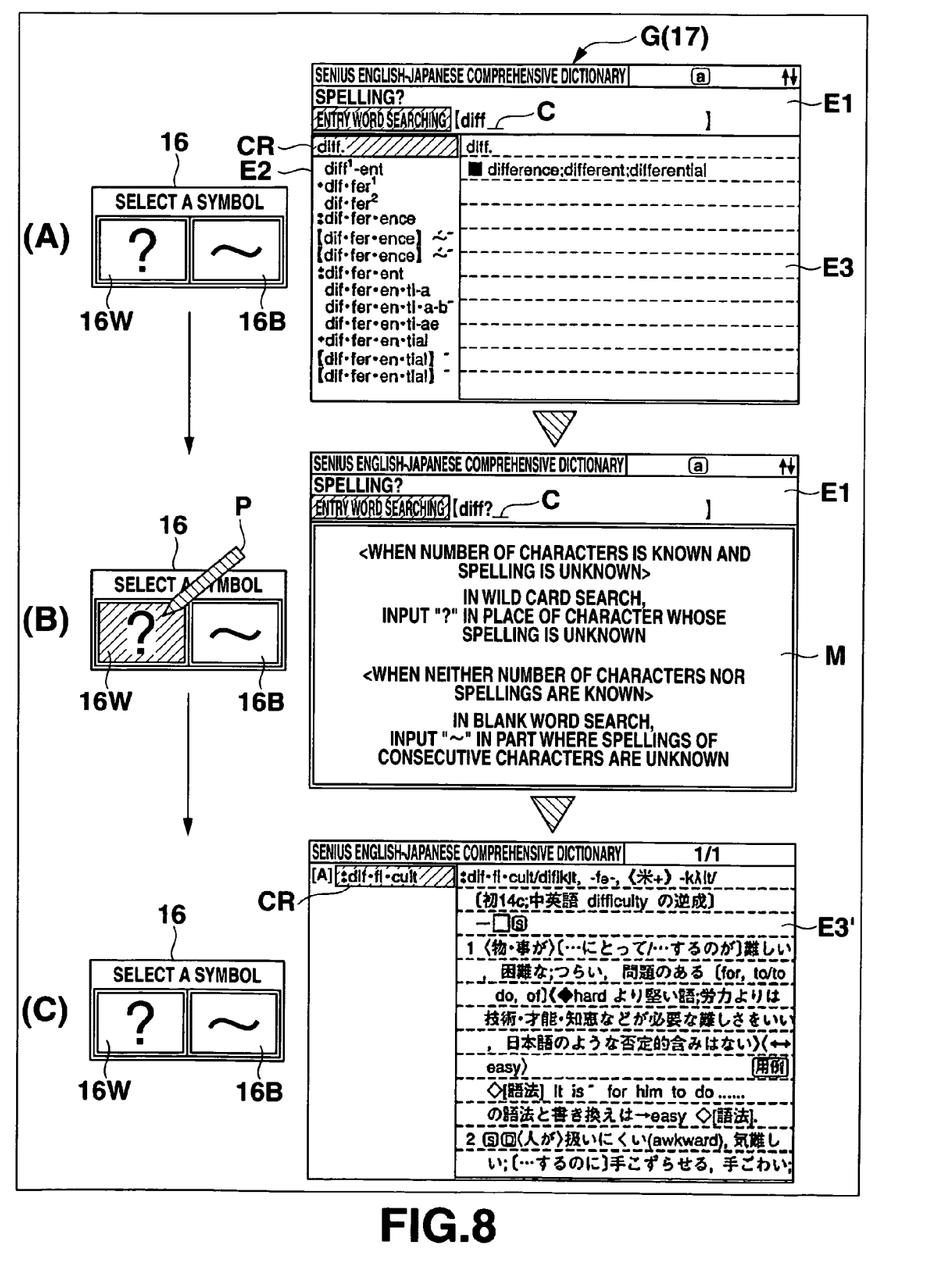
FIG. 8 is a diagram to help explain the dictionary search and display operation capable of wild card search and blank word search involved in the English-Japanese dictionary searching process of the electronic dictionary device 10.

FIG. 8 is a diagram to help explain the dictionary search and display operation capable of wild card search and blank word search involved in the English-Japanese dictionary searching process of the electronic dictionary device 10.

Specifically, when the English-Japanese dictionary searching process of FIG. 7 is started as a result of "English-Japanese dictionary" at the key input section 14 being specified, the dictionary searching screen G with the English search character input area E1 is displayed on the display section 17 as shown in FIG. 8(A) and the electronic dictionary device goes into the search character string (keyword) input waiting state. Moreover, the writing areas 16L, 16R of the handwriting input section 16 are set as wild card input screens 16W, 16B for inputting a wild card symbol "?" or a blank word symbol "~" by touching the screen (step B1).

Here, when the alphabetic keys on the key input section 14 are operated, the input alphabetic characters are not only input sequentially as the English spellings to be searched for and are displayed in the search character input area E1, but also stored into the search character string (keyword) memory 22g (step B2).

Then, when a search character string (keyword), for example, "diff", is keyed sequentially and displayed in the search character input area E1 of the dictionary searching screen G, the entry word which head-coincides with a series of search character strings (keywords) at that time is searched for on the basis of the user-specified dictionary data "English-Japanese dictionary" (22c) each time one character is input and is displayed in an entry word list area E2 (step B3).

Then, the dictionary content (explanatory information) corresponding to the entry word selected by an inverted cursor CR in the entry word list area E2 is read from the user-specified dictionary data "English-Japanese dictionary" (22c) and is displayed in the dictionary content display area E3 (step B4).

Here, for example, in a case where the spelling following the search character string (keyword) "diff" keyed and displayed is unknown, when a wild card search or blank word search is made, the user touches the wild card input screens 16W, 16B set and displayed on the handwriting section 16 as shown in FIG. 8(B), thereby making it possible to easily input and display a wild card symbol "?" in place of a spelling the user does not know, or a blank word symbol "~" in place of a series of spellings the user does not know (step B2).

In this case, in the lower part of the search character input area E1, a wild card input guide message M is displayed.

In this way, for example, when "diff?" is input and displayed in the search character input area E1 as shown in FIG. 8(B) according to the search character string input by operating the keys at the key input section 14 and the wild card symbol "?" or blank word symbol "~" input by touching the wild card input screens 16W, 16B (step B2), the corresponding entry word "difficult" is wild-card-searched from the user-specified dictionary data "English-Japanese dictionary" (22c) and is displayed as shown in FIG. 8(C) (step B3). Then, the dictionary content (explanatory information) is read according to the selected display of the inverted cursor CR caused to correspond to the searched entry word "difficult" and is displayed in the dictionary content display area E3' (step B4).

Accordingly, with the electronic dictionary device 10 with a handwriting input function configured as described above, when the English-Japanese dictionary is selected and specified to input an English search character string, if a spelling is input, characters are input directly by operating the alphabetic keys. When a wild card symbol "?" or a blank word symbol "~" for the following spelling unknown to the user is input, the user touches the wild card input screens 16W, 16B set and displayed on the handwriting input section 16. Consequently, not only can ordinary spellings be input as usual, of course, but also a wild card symbol "?" and a blank word symbol "~" can be input easily by touching the handwriting input section 16 even when a wild card search or a blank word search is made. Therefore, the dictionary searching process on the basis of the English input can be carried out efficiently.

FIG. 9 is a flowchart to help explain the Spanish-Japanese dictionary searching process of the electronic dictionary device 10 with a handwriting input function.

FIG. 10 is a diagram to help explain the example sentence search and display operation involved in the Spanish-Japanese dictionary searching process of the electronic dictionary device 10.

Specifically, when the Spanish-Japanese dictionary searching process of FIG. 9 is started as a result of "Spanish-Japanese dictionary" at the key input section 14 being specified, the dictionary searching screen G with the Spanish search character input area E1 is displayed on the display section 17 as shown in FIG. 10(A) and the electronic dictionary device goes into the search character string (keyword) input waiting state. Moreover, the writing areas 16L, 16R of the handwriting input section 16 are set as n tilde input screens 16&, 16ch for inputting the Spanish special character n tilde "n" or the like by touching the screen (step C1).

Here, when the alphabetic keys on the key input section 14 are operated, the input alphabetic characters are not only input sequentially as a Spanish spelling to be searched for and are displayed in the search character input area E1 (in this case, example sentence search area), but also stored into the search character string (keyword) memory 22g (step C2).

Then, to input the Spanish special character n tilde "n", the n tilde input screens 16&, 16ch set and displayed on the handwriting input section 16 are operated by touching the screens as shown in FIG. 10(B), which makes it possible to easily input and display the Spanish special character n tilde "n" absent in the key input section 14 (step C2).

In this way, when a search character string (keyword), for example, "ban", is keyed sequentially and touch-input and displayed in the search character input area (example sentence search) E1 of the dictionary searching screen G and then "Translate/Decide" key is operated, Spanish example sentences including the entry word coinciding with the series of search character strings (keywords) "ban" are searched for on the basis of the user-specified dictionary data "Spanish-Japanese dictionary" (22c) as shown in FIG. 10(C) and are displayed in list form in the example sentence list area E2' (step C3).

Then, the dictionary content (explanatory information) corresponding to the example sentence selected by an inverted cursor CR in the example sentence list area E2' is read from the user-specified dictionary data "Spanish-Japanese dictionary" (22c) and is displayed in the dictionary content display area E3 (step C4).

Accordingly, with the electronic dictionary device 10 with a handwriting input function configured as described above, when the Spanish-Japanese dictionary is selected and specified to input a Spanish search character string, if alphabetic characters are input, characters are input directly by operating the alphabetic keys. To input the Spanish special character n tilde "ñ" or the interword special character "&", the user touches the n tilde input screens 16&, 16ch set and displayed on the handwriting input section 16. Consequently, not only can ordinary alphabetic characters be input as usual, of course, but also the Spanish special characters "ñ" and "&" can be input easily by touching the handwriting input section 16. Therefore, the dictionary searching process on the basis of the Spanish input can be carried out efficiently.

The language-specific special character touch input function explained in the above embodiments is not limited to the electronic dictionary device 10 and may be applied to a mobile terminal which includes not only a key input section 14 with ordinary character input keys but also a handwriting input section 16 capable of echo back display, and to an electronic information device which has a character input function, such as a personal computer.

Moreover, any of the methods used in the processes carried out by the electronic dictionary device 10 of each of the embodiments, that is, the methods in the Chinese-Japanese dictionary searching process in the flowchart of FIG. 3, the character input process involved in the Chinese-Japanese dictionary searching process in the flowchart of FIG. 5, the English-Japanese dictionary searching process in the flowchart of FIG. 7, the Spanish-Japanese dictionary searching process in the flowchart of FIG. 9, and the like, can be stored as a computer-executable program into an external storage medium 23, such as a memory card (e.g., a ROM card or a RAM card), a magnetic disk (e.g., a floppy disk or a hard disk), an optical disk (e.g., a CD-ROM or a DVD), or a semiconductor memory, and then can be distributed. Then, various computer terminals, which have not only a key input section (14) with ordinary character input keys but also a handwriting input section (16) capable of echo back display and store a dictionary database (22c) for various languages, cause a storage medium reading section 24 to read the program stored in the external storage medium 23 into a memory 22. The operation of the computer terminal is controlled by the read-in program, thereby realizing the function of inputting and displaying characters including language-specific characters and symbols and the dictionary searching and displaying function, which enables the similar processes to be carried out by the above-described methods.

Furthermore, the data of the program to realize the above methods can be transferred in the form of program code over a communication network (Internet) N. The program data can be read from a computer terminal (program server) 20 connected to the communication network (Internet) N, thereby realizing the function of inputting and displaying characters including language-specific characters and symbols and the dictionary searching and displaying function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
a display section;
a dictionary storing section which stores dictionary data;
a dictionary search section;
a key input section comprising Latin alphabet keys, the key input section accepting input of a search character string for searching in a dictionary;
a handwriting input section in which a touch position sensing unit and a display unit are integrated with each other;
a setting section which sets one of handwriting input or pinyin input if a Chinese character is input;
a handwriting input section display control section which (i) accepts input of a handwritten character in the handwriting input section when the handwriting input is set by the setting section, and (ii) displays, on the handwriting input section, a screen for accepting input of four-tone data when the pinyin input is set by the setting section;
a recognized character input section which recognizes the handwritten character accepted by the handwriting input section display control section and input the recognized character as a search character when the handwriting input is set by the setting section; and
a pinyin input section which accepts input of a Latin alphabet letter input by the key input section and the pinyin based on the four-tone data input by the handwriting input section as search letters and characters when the pinyin input is set by the setting section;
wherein the dictionary search section searches the dictionary data based on the input by the pinyin input section or the recognized character input section and displays a search results.

2. The device according to claim 1, wherein the handwriting input section display control section displays input buttons representing a first tone, a second tone, a third tone, a fourth tone, and a light tone as the screen for accepting the input of the four-tone data.

3. The device according to claim 1, wherein the handwriting input section display control section, when an English character string is input to search the dictionary data, controls the handwriting input section to perform display for accepting input of a wild-card character corresponding to an unknown character as a component of the search character string.

4. The device according to claim 1, wherein the handwriting input section display control section, when a character string of a Spanish word is input to search the dictionary data, controls the handwriting input section to perform display for accepting input of a character corresponding to the n tilde of the Spanish word.

5. A method of controlling input of a search character string in a electronic device including a display section, a dictionary storing section which stores dictionary data, a key input section comprising Latin alphabet keys, and a handwriting input section in which a touch position sensing unit and a display unit are integrated with each other, the method comprising:
setting handwriting input or pinyin input if a Chinese character is input;
accepting input of a handwritten character in the handwriting input section when the handwriting input is set, and displaying, on the handwriting input section, a screen for accepting input of four-tone data when the pinyin input is set;
recognizing the handwritten character accepted by the handwriting input section and inputting the recognized character as a search character when the handwriting input is set;
accepting input of a Latin alphabet letter by the key input section when the pinyin input is set;
accepting input of the four-tone data by the handwriting input section when the pinyin input is set;

inputting pinyin based on the Latin alphabet letter input by the key input section and the four-tone data input by the handwriting input section as search letters and characters; and searching the dictionary data based on the inputting pinyin search letters and characters.

6. The method according to claim 5, wherein buttons representing a first tone, a second tone, a third tone, a fourth tone, and a light tone are displayed on the handwriting input section as the screen for accepting the input of the four-tone data.

7. The method according to claim 5, further comprising, when an English character string is input to search dictionary data, controlling the handwriting input section to perform display for accepting input of a wild-card character corresponding to an unknown character as a component of the search character string.

8. The method according to claim 5, further comprising, when a character string of a Spanish word is input to search the dictionary data, controlling the handwriting input section to perform display for accepting input of a character corresponding to the n tilde of the Spanish word.

* * * * *